United States Patent
Fan et al.

(10) Patent No.: US 7,424,047 B2
(45) Date of Patent: Sep. 9, 2008

(54) RECEIVER BASED METHOD FOR DE-SPREADING OF SPREAD SPECTRUM SIGNAL

(75) Inventors: Yiping Fan, Fremont, CA (US); Syang-Myau Hwang, Cupertino, CA (US); Hongyu Li, Cupertino, CA (US); Chieh-Yuan Chao, Fremont, CA (US)

(73) Assignee: Uniband Electronic Corp. (TW)

( * ) Notice: Subject to any disclaimer, the term of this patent is extended or adjusted under 35 U.S.C. 154(b) by 707 days.

(21) Appl. No.: 10/712,643

(22) Filed: Nov. 13, 2003

(65) Prior Publication Data

US 2005/0105596 A1    May 19, 2005

(51) Int. Cl.
*H04B 1/00* (2006.01)
(52) U.S. Cl. .................. 375/147; 375/136; 375/142; 375/152; 375/153; 375/316
(58) Field of Classification Search ............ 375/147, 375/136, 142, 152, 153, 316
See application file for complete search history.

(56) References Cited

U.S. PATENT DOCUMENTS

| 5,629,929 A * | 5/1997 | Blanchard et al. ........... 370/201 |
| 6,707,846 B1 * | 3/2004 | Iwamatsu ................... 375/150 |
| 6,904,106 B2 * | 6/2005 | Papasakellariou et al. ... 375/341 |

* cited by examiner

*Primary Examiner*—Ted Wang

(57) ABSTRACT

A spread spectrum receiver whose de-spreading process based on transformed spreading codes is provided. Instead of de-spreading with original spreading codes, this approach de-spreads received signal with the spreading codes transformed from the original codes in order to eliminate the negative impact of system impairments such as frequency offset to a spread spectrum receiver. Before de-spreading with the transformed code, the received signal goes through the same transformation as the original codes do. After a transformation, the transformed codes may exist some undesirable property such as spreading code having DC content. An approach is given to cancel unwanted side effects relating the transformed spreading codes. The approaches are very effective for spread spectrum system based on frequency modulation scheme such as MSK. For this kind of system, the frequency offset translates to DC offset after the transformation and the DC offset can be cancel since the DC property of the transformed spreading code is known in advance.

19 Claims, 4 Drawing Sheets

RECEIVER BASED METHOD FOR DE-SPREADING OF SPREAD SPECTRUM SIGNAL

FIELD OF INVENTION

The present invention relates to spread spectrum communications, and in particular to methods for de-spreading a spread spectrum signal.

BACKGROUND

Spread spectrum communication systems spread transmitted signals over bandwidths much larger than those actually required to transmit the information. The spreading spectrum technologies have been widely used both in military and commercial wireless communication systems such as the Global Positioning System (GPS), IS2000 mobile communication systems, and applications based on the emerging IEEE 802.15.4 standard. There are many advantages of using the spread spectrum approach, and the most important ones are: (1) due to spreading gain, spread spectrum systems are very robust with respect to noise and interferences; (2) multi-path fading has a much less impact to spread spectrum systems; and (3) spread spectrum systems are inherently secure.

In order to utilize the full potential of spread spectrum systems, spreading codes are constructed to have good auto- and cross-correlation properties. This means that one code can effectively differentiate itself from the other codes under noisy conditions. The ideal spreading codes are orthogonal, which means the cross-correlation between two different codes is zero. FIG. 1 shows the cross-correlation properties of the emerging IEEE 802.15.4's spreading codes for the 2.4 GHz band between Code 1 and Codes 1-16. The first point represents the code correlating to Code 1 and its auto-correlation output. The correlation peak (32) appears when Code 1 correlates to itself. The second point represents the code correlating to Code 2 and its cross-correlation output and so on. The cross-correlation property is not as good as the Walsh code used in IS2000 systems but this code set (consists of 16 codes and each code represents four binary digits) allows a simple hardware implementation.

To get spreading gain, a spreading spectrum receiver needs to de-spread (or correlate) the received signal with the spreading codes. A typical implementation of the de-spreading process is shown in FIG. 2. Here, the received signal is processed using the spreading codes to generate the de-spread output with correlation. The de-spread output is then used for bit or symbol decision making or as input for error correction processing.

However, implementation wise, a practical spread spectrum receiver suffers from impairments, including those due to technology limitations and cost considerations. For example, frequency offset is one type of impairment. The frequency offset is the difference between the transmitted carrier frequency and the receiver demodulation frequency. With a spread spectrum receiver, the time span of spreading code determines the maximum allowable frequency offset. The effect of frequency offset is a reduced spreading gain and eventually causes the spread spectrum receiver unable to demodulate when the frequency offset is beyond certain threshold. Quite often, a spread spectrum receiver incorporates an automatic frequency control (AFC) loop to mitigate the effect of the frequency offset. However, an AFC loop needs frequency detection and compensation scheme, which can be expensive to implement. When a spread spectrum system uses a linear modulation scheme, such as Binary Phase Shift Keying (BPSK) and Quadrature Phase Shift Keying (QPSK), the AFC loop-based approach maybe the only effective approach to combat performance degradation due to frequency.

However, when a spread spectrum signal is modulated by a frequency modulation scheme, such as Frequency Modulation (FM), Minimum Shift Keying (MSK), or Gaussian Minimum Shift Keying (GMSK), the unknown constant frequency error or offset becomes a constant offset in the demodulated signal. This property can be utilized to fully realize spread gain without using an AFC Loop. It is desirable to have innovative methods for de-spreading spread spectrum signals to overcome the shortcoming of prior art technologies.

SUMMARY OF THE INVENTION

It is therefore an object of the present invention to provide simple methods for de-spreading of spread spectrum signals.

It is another object of the present invention to provide a transformed spread spectrum receiver without using an AFC loop.

It is yet another object of the present invention to provide a method for mitigating side-effect of the transformed spread spectrum receiver.

Briefly, the presently preferred novel architecture of the present invention comprises a transformer for transforming the received signal, a multiplier for multiplying the transformed signal and the transformed spreading codes, and an accumulator to sum the multiplied signal. The multiplier and the accumulator combination is often referred as de-spreader. To successfully de-spread the transformed received signal, it is assumed that the two signals at the multiplier are synchronized. Note that before the de-spreading, both the sampled received signal and spreading code are transformed by the same or similar transformation. Since the property of the transformed spreading code is known, it is possible to reduce or cancel undesirable by-products with a cancellation function block following the de-spreader. The cancellation block is used only when it is necessary.

An advantage of the present invention is that it provides simple methods for de-spreading of spread spectrum signals.

Another advantage of the present invention is that it provides a transformed spread spectrum receiver without using an AFC loop.

Yet another advantage of the present invention is that it provides a method for mitigating side-effect of the transformed spread spectrum receiver.

IN THE DRAWINGS

DETAIL DESCRIPTION OF THE PREFERRED EMBODIMENTS

Figure 3:
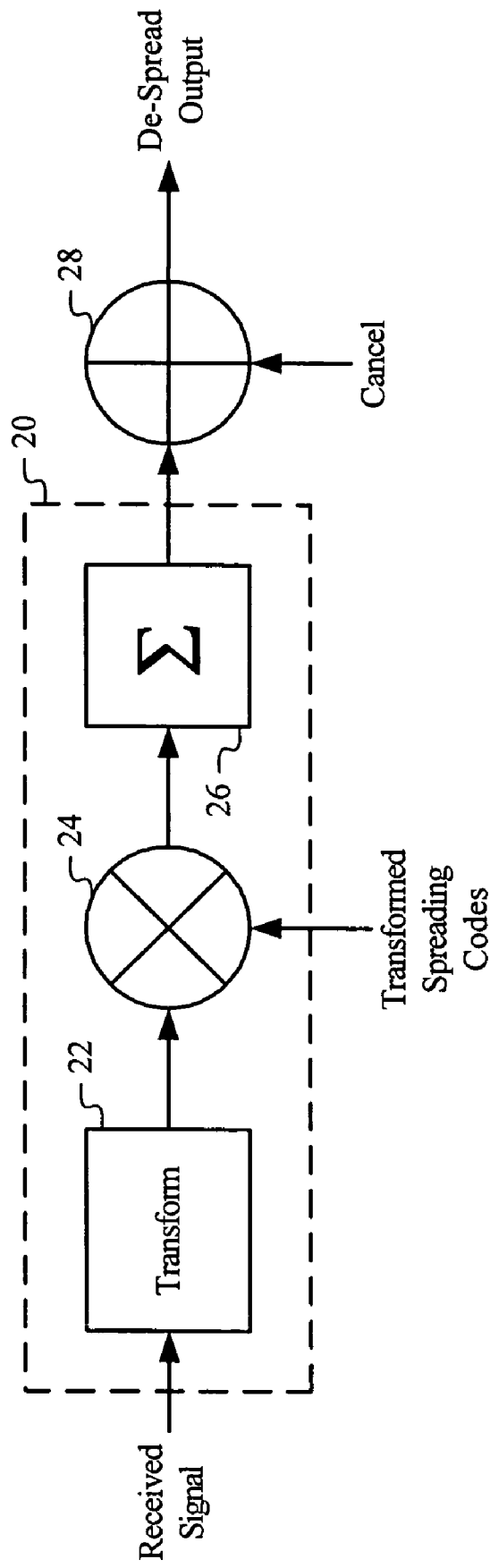
FIG. 3 illustrates a presently preferred de-spreading architecture of the present invention.

Referring to FIG. 3, the presently preferred de-spreading architecture of the present invention is illustrated. Here, there is a first block 20 for de-spreading the received signal and a cancellation function block 28 for removing undesirable by-products. The de-spreading function block 20 is comprised of a transformer 22, a multiplier 24, and an accumulator 26. The received signal is first transformed by the transformer 22 to generate the transformed signal. Then, the multiplier 24 multiplies the transformed signal with the transformed spreading code. Note that both the sampled received signal and spreading code are transformed by the same or similar transformation. The resulting output is summed 26 and is the de-spread output. In this process, there may be undesirable by-products generated. However, since the property of the transformed spreading code is known, it is possible to reduce or cancel undesirable by-products with the use of a cancellation function block 28 following the de-spreader. The cancellation block is used only when it is necessary.

The transformation is a mathematical operation such that receiver-side impairments such as frequency offset has less impact to the transformed signal than to the un-transformed signal after de-spreading. Implementation wise, the transformed spreading codes are unique from the untransformed (or original) spreading codes. For example, as described below, there are 16 unique spreading codes for the emerging IEEE 802.15.4 standard for 2.4 GHz band, and we expect another set of 16 unique codes after transformation. The transformed spreading codes exhibit a different cross-correlation and DC property than the original spreading codes.

Application Specific to IEEE 802.14.5

As an example, the present invention can be applied to the emerging IEEE 802.14.5 physical layer receive demodulation. Here, the modulation scheme for IEEE 802.14.5 2.4 GHz band is offset quadrature phase shift keying (OQPSK) plus half sine filter as the pulse shaping filter. This modulation is equivalent to minimum shift keying (MSK).

Figure 2:
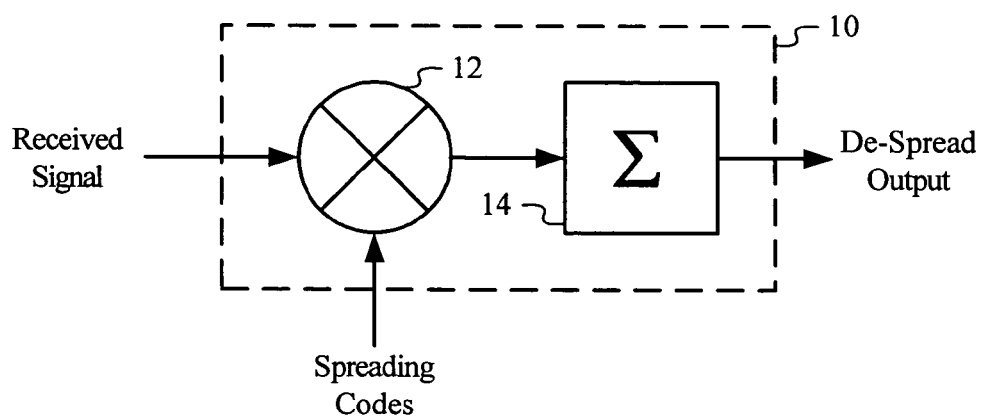
FIG. 2 illustrates a typical implementation of the de-spreading process.

A typical OQPSK spread spectrum receiver first down-converts the RF to DC. Then, it de-spreads the sampled I&Q data (the I&Q data can be either from ADCs or other digital processing unit after the ADCs) in a similar fashion as illustrated in FIG. 2.

The reference clock can be as high as +/−40 ppm as allowed by IEEE 802.14.5. This means if a transmitter has +40 ppm clock error and a receiver has −40 ppm clock error, the total frequency error is 80 ppm. At 2.48 GHz carrier frequency (Channel 26), this translates to 198.4 kHz frequency offset after down conversion at the receiver side. Since the symbol rate is 250 kSymbols/s (chip rate is 2 Mchips/s), the presence of this frequency error neither allows the receiving of the spreading gain nor meeting the required BER or PER (bit or package error rate). It is possible to remove the frequency error before dispreading by using an AFC loop. But an AFC loop is very expensive for this type (cost and power sensitive) of applications.

As we know that the differential demodulation of a MSK signal converts the frequency offset into DC. The magnitude of the DC is linearly proportional to the frequency offset and the DC polarity depends on the polarity of the offset. Lets denote $I(k)$ and $Q(k)$ as the samples of the in-phase and quadrature channel at the k-th instant, the differential output can be expressed as:

$$y(k)=I(k-1)Q(k)-I(k)Q(k-1) \quad (1)$$

The above equation is the transformation shown in FIG. 3 on the signal path and it is also the transformation for the spreading codes (or the original spreading codes).

Figure 1:
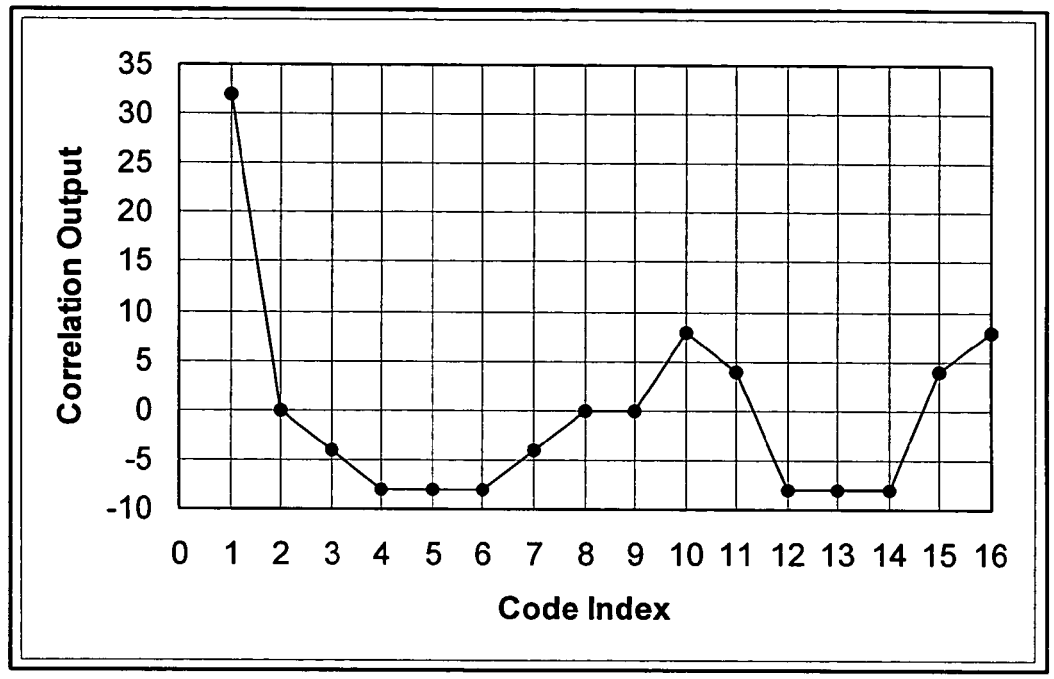
FIG. 1 illustrates the cross-correlation properties of the emerging IEEE 802.15.4's spreading codes for the 2.4 GHz band between Code 1 and Codes 1-16.

Let see how to use this transformation to convert the original codes into transformed codes by using Equation (1). There are 16 spreading codes defined by IEEE 802.14.5 for 2.4 GHz band as shown in Table 1. Each code is 32-bit long and represents 4 binary digits. If 0 is replaced by −1, the cross-correlation property between Code 1 and Code 1-16 is already shown in FIG. 1.

TABLE 1

| | |
|---|---|
| 11011001110000110101001000101110 | Code 1 |
| 11101101100111000011010100100010 | Code 2 |
| 00101110110110011100001101010010 | Code 3 |
| 00100010111011011001110000110101 | Code 4 |
| 01010010001011101101100111000011 | Code 5 |
| 00110101010010001011101101100111 | Code 6 |
| 11000011010100100010111011011001 | Code 7 |
| 10011100001101010010001011101101 | Code 8 |
| 10001100100101100000011101111011 | Code 9 |
| 10111000110010010110000001110111 | Code 10 |
| 01111011100011001001011000000111 | Code 11 |
| 01110111101110001100100101100000 | Code 12 |
| 00000111011110111000110010010110 | Code 13 |
| 01100000011101111011100011001001 | Code 14 |
| 10010110000001110111101110001100 | Code 15 |
| 11001001011000000111011110111000 | Code 16 |

The transformation process is as follows:

(1) Split 2 bits from a code alternately into I and Q data. For example, Code 1 is split into:

I=[1 0 1 0 1 0 0 1 0 0 0 1 0 1 1 1];

Q=[1 1 0 1 1 0 0 1 1 1 0 0 0 0 1 0].

(2) Either convert 1 to 1 and 0 to −1 or 1 to −1 and 0 to 1 for the binaries in I and Q. The I and Q become (1 to 1 and 0 to −1 mapping is used here):

I=[1 −1 1 −1 1 −1 −1 1 −1 −1 −1 1 −1 1 1 1];

Q=[1 1 −1 1 1 −1 −1 1 1 1 −1 −1 −1 −1 1 −1].

(3) Alternately insert zero into I and Q (with the first zero after the first bit of I and the first zero before the first bit of Q) as follows:

I=[1 0 −1 0 1 0 −1 0 1 0 −1 0 −1 0 1 0 −1 0 −1 0 −1 0 1 0 −1 0 1 0 1 0 1 0];

Q=[0 1 0 1 0 −1 0 1 0 1 0 −1 0 −1 0 1 0 1 0 1 0 −1 0 −1 0 −1 0 −1 0 1 0 −].

(4) Insert an initial condition for I and Q at the beginning of the vectors (always 0 for I and either −1 or 1 for Q):

I=[0 1 0 −1 0 1 0 −1 0 1 0 −1 0 −1 0 1 0 −1 0 −1 0 −1 0 1 0 −1 0 1 0 1 0 1 0];

Q=[−1 0 1 0 1 0 −1 0 1 0 1 0 −1 0 −1 0 1 0 1 0 1 0 −1 0 −1 0 −1 0 −1 0 1 0 −1].

−1 is used her for Q's initial condition.

(5) Perform calculation according Equation (1) and map 1 to 1 and −1 and 0, we have the transformed Code 1 as: [1 1 1 0 0 0 0 0 1 1 1 0 1 1 1 1 0 1 0 1 1 1 0 0 1 1 0 1 1 0 0].

The reason for adding the I and Q initial condition is due to Equation (1) which needs 33 I&Q data to construct a transformed code of 32 bit long. The reason for the different initial condition (for Q) with different codes is that the transformed codes have a better characteristic over the ones generated when Q's initial condition is fixed at 1 or −1.

Applying Steps (1) to (5), the original 32 codes are transformed into new codes as shown in Table 2. The initial conditions are:

[−1 −1 −1 1 1 −1 1 1 1 1 −1 −1 1 −1 −1] or

[1 1 1 −1 −1 1 −1 −1 −1 −1 −1 1 1 −1 1 1].

TABLE 2

| | |
|---|---|
| 1110000001110111101011001101100 | Transformed Code 1 |
| 1100110000001110111101011100110 | Transformed Code 2 |
| 0110110011100000011101111010110 | Transformed Code 3 |
| 1110011011001110000001110111010 | Transformed Code 4 |
| 1010111001101100111000000111011 | Transformed Code 5 |
| 0111101011001101100111000000111 | Transformed Code 6 |
| 0111011110101110011011001110000 | Transformed Code 7 |
| 0000011101110101110011011001110 | Transformed Code 8 |
| 0001111110001000010100011001011 | Transformed Code 9 |
| 0011000111110001000010100011001 | Transformed Code 10 |
| 1001001100011111100010000101001 | Transformed Code 11 |
| 0001100100110011111100010000101 | Transformed Code 12 |
| 0101000110010011000111111001000 | Transformed Code 13 |
| 1000010100011001001100011111100 | Transformed Code 14 |
| 1000100001010001100100110001111 | Transformed Code 15 |
| 1111100010000101000110010011001 | Transformed Code 16 |

Figure 4:
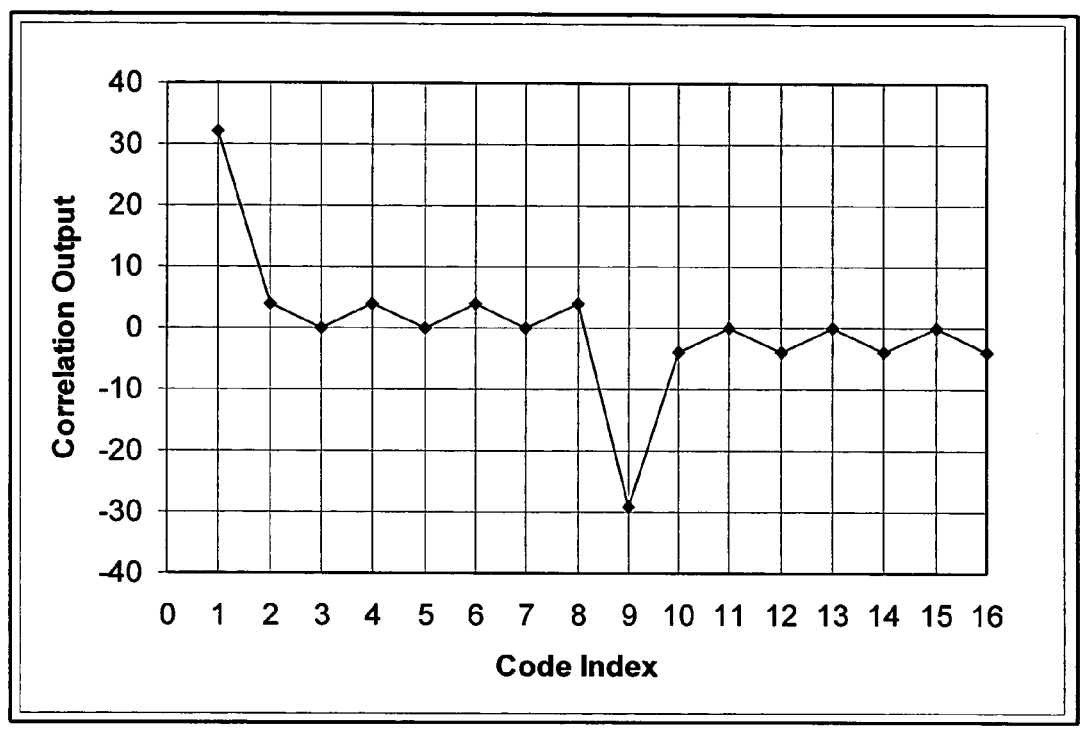
FIG. 4 shows the cross-correlation property between the transformed Code 1 and Code 1-16.

The above codes have the following superior properties: (1) Codes 2 to 8 are obtained by circular shifting left 4, 8, 12, 16, 20, 24, 28 bits; and (2) Codes 9 to 16 are the inversion of Codes 1 to 8. These properties allow an easy implementation of this novel de-spread approach. The cross-correlation property between the transformed Code 1 and Code 1-16 is plotted in FIG. 4. Note that if only the positive correlation output is used to make a decision, the transformed Code 1 has a better cross-correlation property (which has a worst cross-correlation of 4) than the original Code 1 (which has a worst cross-correlation of 8).

However, in the transformed spreading codes, the number of 1's and 0's are not equal. This means that the transformed spreading codes will not completely cancel signal DC content after de-spreading. The DC content is caused by the frequency offset in this example. Replacing 0 with −1 and summing all values in each code, the DC value is +4 for Codes 1-8 and −4 for Codes 9-16. This means that if the DC is 1 in the signal input, after de-spreading, the DC content is 4 at the de-spread output with Coeds 1-8, and is −4 with Codes 9-16. This means the de-spread process with the transformed codes has a gain of 4 for the DC offset with polarities.

The scheme for cancellation of the DC content of the above mentioned transformed spreading code works as follow: (1) Summing M samples (M is an integer greater than 32 and a large M gives a better DC estimation); (2) if the transformed Codes 1-8 are used, subtract 4/M of the summation from the de-spread output (Note 1/M of the summation is the average and 4/M is due to the DC offset gain factor); Otherwise, add 4/M of the summation to the de-spread output. For easy implementation, M is a multiple of 32. For example, if M=64, 4/M=4/64=1/16, division by 16 is equivalent to right shift the summation by 4 binary bits.

Figure 5:
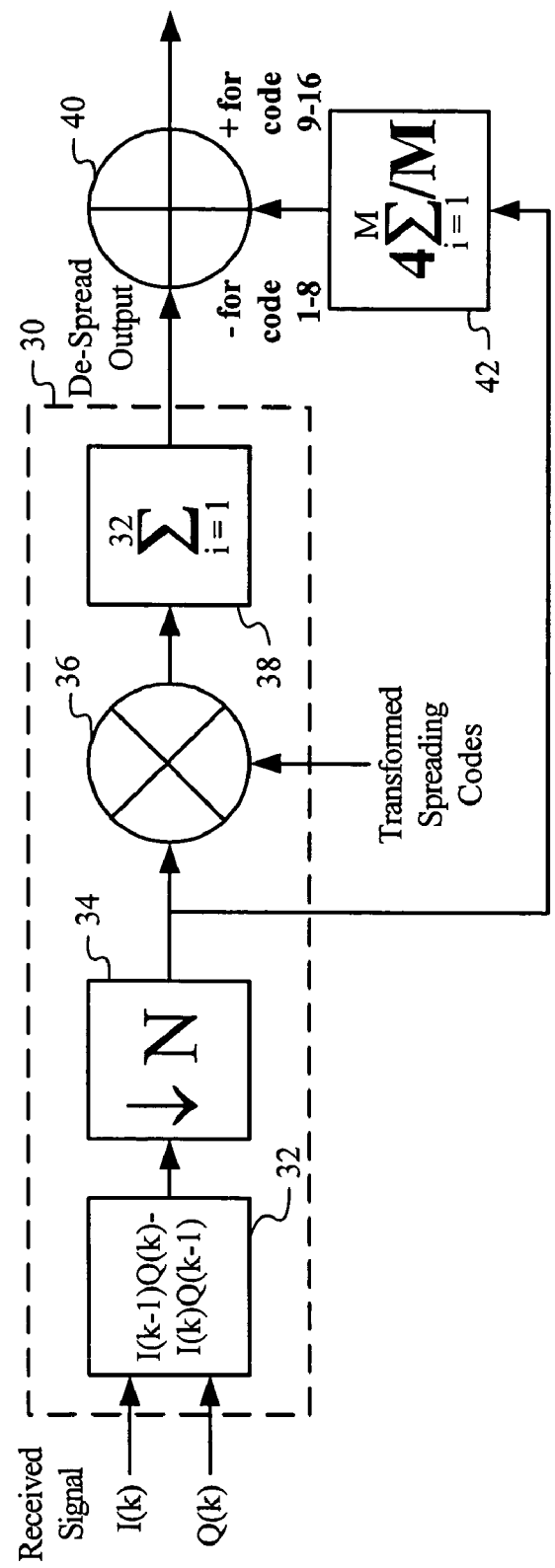
FIG. 5 illustrates a novel de-spreading and DC Cancellation block for IEEE 802.15.4 applications.

FIG. 5 depicts a novel de-spread and DC cancellation block 30. Here, the I and Q samples are transformed using a differentiator 32 implementing Equation (1). Note that the I and Q input samples can be at any sampling rate greater than the chip rate. Preferably, the sampling rate is multiple of the chip rate. After the transformation, the data is down sampled 34. After the down-sampling, the data sampling rate has to be 2 Msamples/s and the date is de-spread (36 and 38) by the 2 Mchips/s transformed codes. The reason for the over sampling data is to get the data which has the least ICI (inter chip interference) from the over sampled data for de-spreading. Then, the DC offset is calculated by the DC offset estimator having a gain of four and the de-spread output passes a DC cancellation adder 40 and the de-spread output after the DC cancellation is used to decide which code has been transmitted.

When all 16 transformed codes are used in de-spreading, the code that produces the most positive peak (after DC cancellation) is the code considered transmitted.

When only Codes 1-8 are used for de-spreading, the method to determine which code transmitted is as follow: (1) If Code X produces the biggest peak (either positive or negative after DC cancellation) and if the peak polarity is positive, then Code X is considered to be transmitted. If the polarity is negative, Code X+8 is considered to be transmitted.

When only Codes 9-16 are used for de-spreading, the method to determine which code transmitted is as follow: (1) If Code X produces the biggest peak (either positive or negative after DC cancellation) and if the peak polarity is positive, then Code X is considered to be transmitted. If the polarity is negative, Code 16−X is considered to be transmitted.

Please note the use of DC cancellation is optional.

While the present invention has been described with reference to certain preferred embodiments, it is to be understood that the present invention is not to be limited to such specific embodiments. Rather, it is the inventor's contention that the invention be understood and construed in its broadest meaning as reflected by the following claims. Thus, these claims are to be understood as incorporating and not only the preferred embodiment described herein but all those other and further alterations and modifications as would be apparent to those of ordinary skilled in the art.

We claim:

1. A method for despreading a received spread spectrum signal, comprising the steps of:
    transforming said received signal;
    multiplying said transformed signal with a set of transformed spreading codes; and
    summing said multiplied signal to generate a despread signal, wherein said transformed spreading codes are generated by transforming spreading codes using a transformation method, comprising the steps of:
    splitting two bits from a spreading code alternately into I and Q data;
    converting said I and Q data;
    inserting zeros alternately into said I and Q data;
    inserting an initial condition for said I and Q data; and
    calculating transformed output as a function of said I and Q data.

2. A method as recited in claim 1 further including an additional step after said summing step for canceling byproducts from said despread signal.

3. A method as recited in claim 1 wherein said transforming step and said transformed spreading codes use the same transformation.

4. A method as recited in claim 1 wherein in said inserting zeros step the first zero is inserted after the first bit of said I data and the first zero is inserted before the first bit of said Q data.

5. A method as recited in claim 1 wherein said inserting an initial condition step a zero is inserted for said I data and a −1 or 1 is inserted for said Q data.

6. A method as recited in claim 1 wherein in said calculating step the equation, $y(k)=I(k-1)Q(k)-I(k)Q(k-1)$, is used for calculating said transformed codes.

7. A method as recited in claim 2 wherein said canceling step comprises the following substeps: summing M samples, where M is an integer;
    subtracting 4/M from said output for said transformed spreading codes in the range of 1-8; and
    adding 4/M to said output for said transformed spreading codes in the range of 9-16.

8. A method for despreading a received, sampled spread spectrum signal, comprising the steps of:
   transforming said received signal; down sampling said transformed signal;
   multiplying said down sampled signal with a set of transformed spreading codes; and
   summing said multiplied signal to generate a despread signal wherein said transformed spreading codes are generated by transforming spreading codes using a transformation method, including the steps of:
   splitting two bits from a spreading code alternately into I and Q data;
   converting said I and Q data; inserting zeros alternately into said I and Q data;
   inserting an initial condition for said I and Q data; and
   calculating transformed output as a function of said I and Q data.

9. A method as recited in claim 8 wherein said transforming step and said transformed spreading codes use the same transformation.

10. A method as recited in claim 8 wherein in said inserting zeros step the first zero is inserted after the first bit of said I data and the first zero is inserted before the first bit of said Q data.

11. A method as recited in claim 8 wherein said inserting an initial condition step a zero is inserted for said I data and a −1 or 1 is inserted for said Q data.

12. A method as recited in claim 8 wherein in said calculating step the equation, $y(k)=I(k-1)Q(k)-I(k)Q(k-1)$, is used for calculating said transformed codes.

13. A method as recited in claim 8 further including an additional step after said summing step for canceling byproducts from said despread signal.

14. A method as recited in claim 13 wherein said canceling step comprises the following substeps:
   summing M samples, where M is an integer;
   subtracting 4/M from said output for said transformed spreading codes in the range of 1-8; and
   adding 4/M to said output for said transformed spreading codes in the range of 9-16.

15. A method for converting spreading codes for de-spreading a spread spectrum signal to transformed codes for de-spreading said spread spectrum signal, said spreading codes comprising of 0's and 1's, comprising the steps of:
   splitting two bits from a spreading code alternately into I and Q data;
   converting said I and Q data; inserting zeros alternately into said I and Q data;
   inserting an initial condition for said I and Q data; and
   calculating transformed codes as a function of said I and Q data.

16. A method as recited in claim 15 wherein in said inserting zeros step the first zero is inserted after the first bit of said I data and the first zero is inserted before the first bit of said Q data.

17. A method as recited in claim 15 wherein said inserting an initial condition step a zero is inserted for said I data and a −1 or 1 is inserted for said Q data.

18. A method as recited in claim 15 wherein in said calculating step the equation, $y(k)=I(k-1)Q(k)-I(k)Q(k-1)$, is used for calculating said transformed codes.

19. A method as recited in claims 14 wherein said canceling step is performed as a function of an average of said down sampled signal and said despread signal.

* * * * *